April 8, 1947.   R. G. SHEPHERD, JR., ET AL   2,418,605
FILTER TRANSPARENT TO INFRARED RADIATION AND OPAQUE TO VISIBLE LIGHT
Filed Dec. 15, 1944

Patented Apr. 8, 1947

2,418,605

UNITED STATES PATENT OFFICE 2,418,605

FILTER TRANSPARENT TO INFRARED RADIATION AND OPAQUE TO VISIBLE LIGHT

Ridgley G. Shepherd, Jr., Needham Heights, and Cutler D. West, Cambridge, Mass., assignors to Polaroid Corporation, Cambridge, Mass., a corporation of Delaware Application December 15, 1944, Serial No. 568,242

7 Claims. (Cl. 88—109)

This invention relates to light filters, and more particularly to the production of new and improved selectively light-absorbing material for transmitting infrared radiation while substantially absorbing visible light.

An object is to provide such light-filtering material in sheet plastic form which may if desired be laminated between protective layers of glass or other hard transparent material.

Another object is to provide such material which will be highly stable under service conditions requiring exposure to relatively intense heat.

A further object is to provide light-filtering material of the above characteristics by dyeing regenerated cellulose with a plurality of vat dyes so chosen with respect to their absorption characteristics that in combination they substantially totally absorb visible light but are highly transparent to infrared radiation.

A still further object is to provide a substantially continuous process for producing sheet plastic material having the above characteristics.

Additional objects and advantages will in part appear and in part be pointed out in the course of the following detailed description of several embodiments of the invention, which are given as nonlimiting examples, in connection with the accompanying drawings in which.

In accordance with the invention, light-filtering material of the desired characteristics is provided by incorporating in a suitable organic plastic carrier a plurality of dyes so chosen with respect to their individual absorption characteristics that, in combination, they substantially totally absorb visible light but are transparent to infrared radiation. Such light-filtering material is particularly useful for transmitting the invisible infrared radiation from an incandescent source while totally suppressing the visible radiations from said source, but it will be apparent that such filtering material will in general be used substantially closely adjacent such light source and that it should be as stable as possible under relatively intense heat.

Figure 1:
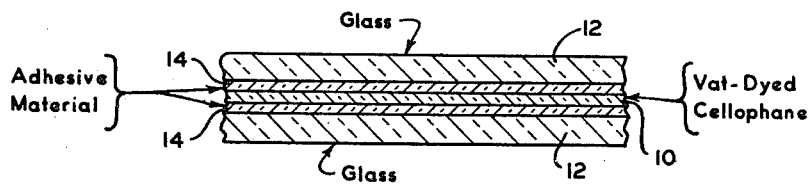
Figure 1 is a sectional view illustrating diagrammatically an embodiment of the invention.

Light-filtering material meeting the above requirements has been provided in accordance with the invention by embodying a plurality of suitably chosen vat dyes in a transparent, heat stable, organic plastic material. Plastics found suitable for the purpose of the invention include cellulosic plastics such as cellulose acetate and regenerated cellulose, with the latter being a preferred example. In Fig. 1, element 10 represents a sheet of regenerated cellulose dyed in accordance with the invention and bonded between protective layers 12 of glass or the like by means of any suitable layers 14 of adhesive material such particularly as polyvinyl alcohol or a suitable methacrylate. It should also be noted that for many uses the filtering sheet 10 of the invention may be bonded to a single glass plate 12 in any suitable manner. Layers 12 will preferably comprise relatively heat-resistant material such, for example, as Pyrex glass.

A variety of different dyes have been found suitable for the purpose of the invention, and choice among them may be determined partly by convenience and partly in accordance with the particular spectral characteristics desired in the finished filter material. It is convenient in selecting dyes for use in the practice of the invention to select first one which will, in the proper concentration, substantially totally absorb visible red light but will transmit as high a proportion as possible of infrared radiation, particularly near infrared radiation. It is then relatively simple to select one or more additional dyes which will absorb all of the shorter wavelengths of visible light which may be transmitted by the first said dye. Several examples of suitable combinations will accordingly be given with the understanding that they are merely illustrative embodiments of the invention and not otherwise limiting thereto.

Among the minus red dyes which have been found satisfactory for the practice of the invention, two preferred examples are Carbanthrene Blue GCD (C. I. 1113) and Ponsol Jade Green (C. I. 1101). Each of these dyes is to be found in "Colour Index," a publication of the Society of Dyers and Colourists (Bradford, England, 1924). In relatively high concentrations both of these dyes appear substantially black to the eye, but when used in conjunction with a source of intense light, some transmission of blue or green light will be noted. This residual light may readily be absorbed by combining with either of said dyes a suitable red dye such, for example, as Ponsol Red G2B (Pr. 106). This dye is referred to in the "1938 Yearbook of the American Association of Textile Chemists and Colorists," vol. 15 (Howes Publishing Co., New York, 1938). The application of the dyes to the plastic sheet may be accomplished in a variety of ways, but it is desirable to employ a continuous dyeing process as illustrated in Fig. 2.

Figure 2:
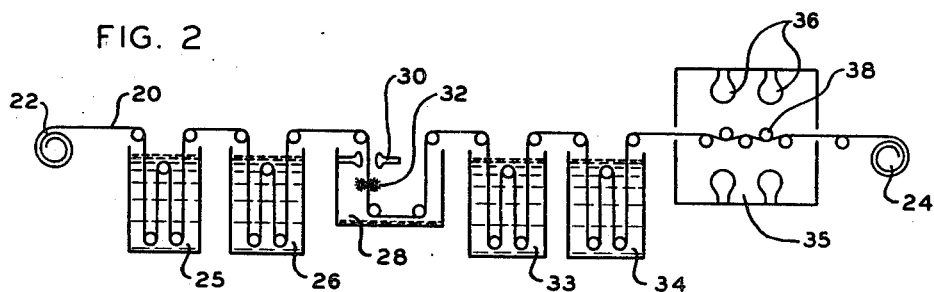
Figure 2 is a diagrammatic view illustrating a process and apparatus for producing the sheet plastic light-filtering material of the invention.

Sheet 20 in Fig. 2 may comprise regenerated cellulose or Cellophane of any suitable thickness such for example as 0.0015 inch, passing from a supply roll 22 through a series of tanks and other treating chambers to a take-up roll 24. Tanks 25 and 26 each contain a solution of one or the other component of one of the above-noted combinations of dyes, for example Carbanthrene Blue GCD and Ponsol Red G2B. Each of said solutions may be made up approximately as follows:

| | |
|---|---|
| Dye grams | 3000 |
| Sodium hydroxide do | 900 |
| Sodium hydrosulfite do | 670 |
| Water to make liters | 50 |

The temperature of these two solutions is preferably maintained at substantially 80° C. and the length of time any given part of sheet 20 remains in each tank may be readily controlled both by the speed of the sheet through the tank and by the number of guide rolls around which the sheet is looped in each tank. Generally speaking, this time may run from 6 to 10 minutes for each dye solution depending primarily upon the strength of the solution. It is immaterial whether sheet 20 be treated first with the blue or the red dye solution, and thereafter it is preferably washed by passing through tank 28 between water sprays 30 and rotating brushes 32.

Since both of the dyes in tanks 25 and 26 are in their leuco form, it is necessary that they be oxidized to their proper final color, and tank 33 accordingly contains a suitable oxidizing solution which may, for example, be made up as follows:

| | |
|---|---|
| Sodium perborate grams | 450 |
| Acetic acid cc | 300 |
| Water to make liters | 50 |

Sheet 20 may be permitted to remain in the oxidizing solution for approximately 2 to 4 minutes and thereafter is preferably passed through tank 34 containing a replasticizing solution, such for example as an 18% solution of glycerine in water. Thereafter sheet 20 may be dried in any suitable way as, for example, by passing through a chamber 35 provided with any suitable source of heat such for example as a plurality of infrared lamps 36. Rolls 38 within chamber 35 are also of use in helping to flatten and smooth sheet 20 before it passes to take-up roll 24.

It will be understood that in a continuous process of dyeing such as that just described the strength of the dye solutions is gradually decreased, and it is accordingly desirable that they be replenished periodically. In general it is satisfactory if this be done at intervals of approximately one-half hour, but it is desirable to inspect the finished sheet still more often in order to maintain a closer check on the strengths of the dye solution. When additions to the dye solutions are needed, it has been found that a suitable charge may comprise 500 grams of the proper dye, 200 grams of sodium hydroxide and 150 grams of sodium hydrosulfite.

Figure 3:
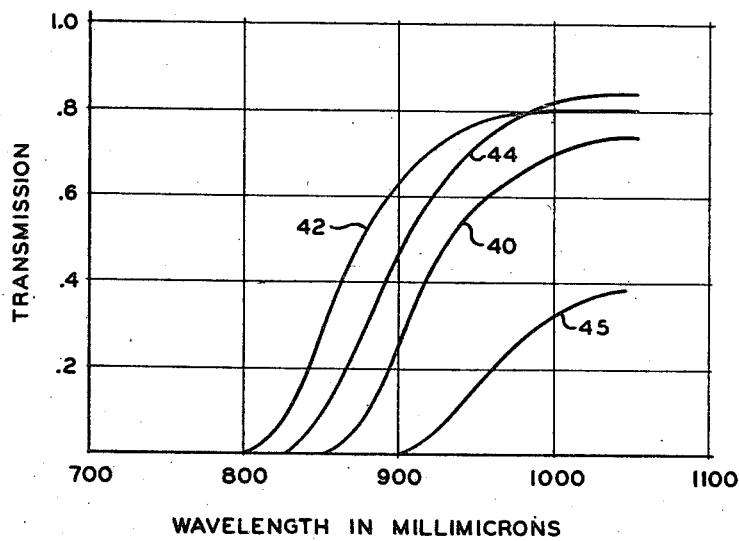
Figure 3 is a graph illustrating the light-transmitting properties of several embodiments of the invention.

Curve 40 in Fig. 3 illustrates the transmission characteristics of a typical product of the above process utilizing the above dye solutions. It will be noted from curve 40 that such a sheet will transmit substantially no light of wavelength shorter than approximately 850 m$\mu$, but that its transmission rises relatively rapidly to approximately 60% at 950 m$\mu$. Curve 42 in Fig. 2 illustrates the transmission characteristics of another typical sheet dyed as described above but with the dyeing times substantially shorter than in the case of the sheet represented by curve 40. It will be noted that curves 40 and 42 are substantially parallel but that curve 42 shows transmission at shorter wavelengths and higher transmission in the near infrared than curve 40. The two curves are given as illustrative of the variations in the transmission characteristics obtainable by variation in the times of the dyeing steps of the above processes, and it will be understood that further variations in dyeing times or the concentrations of the dye solutions will produce corresponding variations in the transmission characteristics of the resulting filters.

Curve 44 in Fig. 3 represents the transmission characteristics of a filter produced by dyeing Cellophane with the above combination of Ponsol Jade Green and Ponsol Red G2B. For example, the solution in one of tanks 25 and 26 may be made up as follows:

| | |
|---|---|
| Ponsol Jade Green grams | 1800 |
| Sodium hydroxide do | 600 |
| Sodium hydrosulfite do | 450 |
| Water to make liters | 50 |

In this case the solution in the other tank will be similar except that the dye component therein will comprise 1500 grams of Ponsol Red G2B. Replenishments should be added to each tank as indicated above and may comprise 150 grams of sodium hydroxide, 112.5 grams of sodium hydrosulfite and 375 grams of the proper dye. The solutions in the other tanks may remain the same as in the first above example, and the times of dyeing may be controlled within the general ranges described in connection therewith.

It is under some conditions desirable to dye separate sheets with one or the other of a combination of dyes used in the practice of the invention and then to combine these separately dyed sheets to form the final infrared transmitting filter. This is particularly useful under conditions such that it may be desired to vary the amount of transmitted light adjacent the red end of the spectrum by rapidly varying the density of the minus red component of the filter. That is to say, instead of a single sheet dyed with both dyes there may for example be provided one red sheet and a plurality of blue sheets, one or more of which may be combined with the red sheet to provide a filter substantially absorbing visible light but the cut-off of which at the red end of the spectrum may be varied at will. Separately dyed sheets for use in such a combination may be prepared by modifying the apparatus shown in Fig. 2 and the process described in connection therewith to the extent of eliminating one of tanks 25 and 26. Curve 45 in Fig. 2 illustrates typical transmission characteristics for an assembly of superimposed sheets comprising one sheet of Cellophane dyed with Ponsol Red G2B and three sheets dyed with Carbanthrene Blue GCD. It will be noted that said curve shows complete cut-off at approximately 900 m$\mu$ and a relatively slow rise in transmission over the adjacent infrared band. It will be understood that any desired characteristics such as might be illustrated by any curve intermediate the curves in Fig. 3 may readily be obtained by the appropriate variation of dyes, thickness, concentration or time of dyeing.

It should be apparent from the foregoing examples that the present invention is subject to substantial variation within the scope thereof. As has already been indicated, the order of the dyeing steps is immaterial and it should also be pointed out that it is equally possible to carry out the oxidizing step separately for each dye. The foregoing combinations of dyes are given merely as illustrative of some found particularly practical for the purposes of the invention and many other similar combinations will doubtless be apparent to those skilled in the art and are to be construed as coming within the scope hereof. A considerable variety of organic plastics may be used in the practice of the invention, although for preferred results it is desirable to utilize a substantially non-thermoplastic material, as in the case of regenerated cellulose. It will also be understood that the invention is not limited to the above-described process nor to a continuous dyeing process of any kind. Furthermore, the invention is not limited to the use of vat dyes, and the principles thereof may be applied to other selectively light-absorbing materials of the desired heat stability. For example, other organic pigments may be used such as one of the phthalocyanins in combination with any suitable red pigment having the desired absorption for the shorter wavelengths of visible light. Said pigments may readily be dispersed in the desired plastic in finely divided condition, by thorough mixing in a solution of a plastic such as cellulose acetate and then casting said solution to form a sheet. All such modified applications of the principles of the invention are to be construed as coming within the scope hereof.

Since certain changes in carrying out the above process, and certain modifications in the products which embody the invention may be made without departing from its scope, it is intended that all matter contained in the above description, or shown in the accompanying drawings shall be interpreted as illustrative and not in a limiting sense.

What is claimed is:

1. A light-filtering material comprising a sheet of regenerated cellulose having incorporated therein a vat dye substantially totally absorbing visible red light but substantially transmitting infrared radiation and at least one other vat dye absorbing visible light in a region of the spectrum different from the region wherein said first-named dye absorbs, the absorption curves of said dyes being such that in combination they substantially totally absorb visible light but are transparent to infrared radiation.

2. A light-filtering material comprising a sheet of regenerated cellulose having incorporated therein a plurality of vat dyes, said dyes having individual absorption curves such that said sheet substantially totally absorbs visible light but is substantially transparent to infrared radiation, said dyes comprising Ponsol Red G2B (Pr. 106) and Carbanthrene Blue GCD (C. I. 1113).

3. A light-filtering material comprising a sheet of regenerated cellulose having incorporated therein a plurality of vat dyes, said dyes having individual absorption curves such that said sheet substantially totally absorbs visible light but is substantially transparent to infrared radiation, said dyes comprising Ponsol Red G2B (Pr. 106) and Ponsol Jade Green (C. I. 1101).

4. A light-filtering material comprising a sheet of regenerated cellulose having incorporated therein a plurality of vat dyes, said dyes having individual absorption curves such that said sheet substantially totally absorbs visible light but is substantially transparent to infrared radiation, said sheet being laminated between a plurality of layers of glass by an adhesive comprising polyvinyl alcohol.

5. A filter cutting off visual light but showing high transmission in the near infrared comprising a transparent sheet of regenerated cellulose dyed with a mixture of light and heat stable vat dyes, the individual dyes having high transmission in the near infrared and having complementary regions of high absorption throughout the visual spectrum.

6. A filter cutting off visual light but showing high transmission in the near infrared comprising a transparent sheet of cellulosic material dyed with a mixture of light and heat stable vat dyes, the individual dyes having high transmission in the near infrared and having complementary regions of high absorption throughout the visual spectrum.

7. A filter cutting off visual light but showing high transmission in the near infrared comprising transparent sheet material of regenerated cellulose dyed with a plurality of light and heat stable vat dyes, at least one of said dyes substantially totally absorbing visible red light, the individual dyes having a high transmission in the near infrared and having complementary regions of high absorption throughout the visual spectrum.

RIDGLEY G. SHEPHERD, JR.
CUTLER D. WEST.

REFERENCES CITED

The following references are of record in the file of this patent:

UNITED STATES PATENTS

| Number | Name | Date |
| --- | --- | --- |
| 1,905,095 | Howell et al. | Apr. 25, 1933 |
| 1,959,980 | Henderson, et al. | May 22, 1934 |
| 2,062,179 | Hunter | Nov. 24, 1936 |
| 2,193,751 | Wenk et al. | Mar. 12, 1940 |
| 2,265,559 | Watkins | Dec. 9, 1941 |

FOREIGN PATENTS

| Number | Country | Date |
| --- | --- | --- |
| 181,902 | British | June 29, 1922 |
| 320,044 | British | Oct. 2, 1929 |

OTHER REFERENCES

"Wratten Light Filters," publ. by Eastman Kodak Co., Rochester, New York, 1929; pages 19, 56, 57, 61, 62, 77 to 80 and 83.